April 4, 1961 A. R. TOPFER 2,978,388

ELECTROCHEMICAL METHOD

Filed Jan. 27, 1959

INVENTOR.
ALVIN R. TOPFER

BY

Allen V. Hazeltine
ATTORNEY

United States Patent Office 2,978,388

Patented Apr. 4, 1961

2,978,388

ELECTROCHEMICAL METHOD

Alvin R. Topfer, Ambler, Pa., assignor to Philco Corporation, Philadelphia, Pa., a corporation of Pennsylvania Filed Jan. 27, 1959, Ser. No. 789,446

23 Claims. (Cl. 204—16)

This invention relates to a method for bonding together electrically conductive elements, and more particularly to a method for bonding a conductive structure to a semiconductive structure. The invention additionally relates to a method for fabricating a semiconductive structure. The present application is a continuation-in-part of my copending application Serial No. 554,243, filed December 20, 1955, and now abandoned.

In recent years, semiconductive devices have become increasingly important in the electronic art. The semiconductive diode is almost indispensible in ultra-high frequency receiving equipment, while the transistor has demonstrated its superiority to vacuum tubes in many applications. However, because of their relatively high cost, in many applications these semiconductive devices heretofore have been unable to compete with their less expensive vacuum-tube counterparts. This relatively high cost comes about in large measure by reason of the expensiveness of the manufacturing procedures which heretofore have been utilized to fabricate such semiconductive devices, particularly because of one or more of the requirements that the devices be made from a semiconductive material of extreme purity, processed under conditions of scrupulous cleanliness, or manipulated with great care and accuracy, especially where, as is common, the elements thereof are extremely small.

An especially difficult step in the fabrication process is that of securing lead wires to the rectifier electrodes of the semiconductive device. Heretofore, this has been accomplished by a soldering operation which is inherently a delicate one by reason of the typical smallness of the electrodes to which the lead wires must be secured, and the even smaller diameter of the lead wires. It is, moreover, a step during which many of the semiconductive devices have heretofore been destroyed or rendered inferior, by being heated to excessively high temperatures, e.g. temperatures at which the semiconductive surfaces are highly reactive and therefore combine readily with contaminants, and at which the rectifier electrodes themselves often melt. The problem of overheating is aggravated by the fact that the semiconductive body and its rectifier electrodes are highly heat conductive, and in addition, the mass of the semiconductive device is small, so that the device rapidly attains the temperature of a heat source applied thereto.

To avoid these twin evils of overheating and surface contamination, the art has resorted to solders melting at relatively low temperatures (e.g. 70° C.), and to the use of streams of heated reducing gases (e.g. hydrogen) as heat sources for the soldering operation. However, it is apparent that semiconductive devices containing a low-melting solder are unsatisfactory for many purposes, inasmuch as these devices cannot then be used in applications wherein the ambient temperature of the device may approach the relatively low melting point of the solder. Moreover, the use of gas, and particularly of hydrogen, as a heat source is undesirable because of the hazard of explosion and fiire and because of the difficulty in controlling the manner in which the gas heats the semiconductive device. In addition, reducing gas of the requisite purity may be relatively expensive.

Accordingly, it is an object of the invention to provide an improved method for bonding together conductive elements.

An additional object of the invention is to provide an improved method for bonding a conductive structure to a semiconductive structure.

A further object of the invention is to provide an improved method for bonding a conductive element to the anode of an asymmetrically-conductive device.

Still another object of the invention is to provide an improved method for bonding a metal to a body of semiconductive material.

A still further object of the invention is to provide an improved method for forming a rectifying contact on a body of semiconductive material and for bonding a conductor to said rectifying contact.

A specific object of the invention is to provide an improved method for bonding conductive elements to the emitter and collector contacts, respectively, of a transistor.

A salient object of the invention is to provide an improved method for attaching lead wires securely to the elements of a semiconductive device.

An important object of the invention is to provide a method for bonding lead wires to a semiconductive structure, which method requires only a minimum of handling of the structure and the wires, and in which method the temperature to which the semiconductive structure is heated may be accurately determined.

A further important object of the invention is to provide a method for bonding lead wires to a semiconductive structure, which method inherently preserves the chemical cleanliness of the semiconductive body and is easily controlled to prevent overheating of the structure.

An even more specific object of the invention is to provide an improved method for bonding lead wires to the emitter and collector contacts, respectively, of a transistor having a base element constituted of n-type material.

Another specific object of the invention is to provide an improved method for simultaneously forming the emitter and collector contacts of a transistor on a semiconductive body, and for bonding conductive elements to said emitter and collector contacts, respectively.

Still another object of the invention is to provide an improved method for fabricating asymmetrically-conductive devices.

A further object of the invention is to provide an improved method for fabricating semiconductive devices, which method is fast, inexpensive, and easily adapted to mass production techniques.

In accordance with the invention, the foregoing objects are achieved by the provision of a method for bonding together two electrically conductive elements, which method comprises the steps of immersing these two elements in a solution which contains ions of a metal to be plated, and which is maintained at a temperature exceeding the melting point of said metal, and applying a voltage between said two elements to plate said metal, in molten form, onto at least one of said elements in an amount sufficient to provide a deposit extending from one element to the other element. Desirably, the two electrically-conductive elements are initially positioned adjacent one another in said solution, and the metal which is plated is one which wets both of said elements. The temperature of the plated metal which joins the two conductive elements is then reduced to a value less than the melting point of this metal, theerby to bond together the two elements.

In one preferred embodiment of the invention, one of the electrically-conductive elements is a semiconductive body having a rectifier contact applied thereto, while the other element is a conductor positioned adjacent said rectifier contact. A negative potential is applied to the aforesaid conductor, while a positive potential is applied to the semiconductive body, the potential difference between body and conductor being greater than the deposition potential of the metal to be plated. Accordingly, the metal plates from the solution onto the conductor, being deposited most heavily on that portion of the conductor which is closest to the rectifier contact. This plating is continued until an amount of metal has deposited onto said conductor which is sufficient to join the conductor to the rectifier contact. The metal is then cooled to a temperature below its melting point, thereby bonding the conductor securely to the rectifier contact.

Inasmuch as the semiconductive body is maintained at a positive potential, there is also produced at least some degree of etching of the body, during the time that the conductor is being plated. It is one feature of the invention that this etching maintains the surface of the semiconductive body chemically clean throughout the bonding process, without the necessity of providing an atmosphere of a reducing gas or an inert gas to prevent contamination of the semiconductive surface.

In one specific arrangement according to the invention, the semiconductive body may comprise n-type germanium, and the rectifying contact may be constituted of indium, a metal which melts at 155° C. The electrolytic solution may contain ions of indium and cadmium appropriately concentrated and complexed so as to cause both the indium and the cadmium to plate at substantially the same deposition potential, and in eutectic proportions. This cadmium-indium eutectic melts at 122.5° C. The conductor may comprise a lead wire positioned in adjoining relationship to the rectifying contact. To cause the cadmium-indium metal to deposit in molten state upon the conductor and rectifying contact without melting the rectifying contact, the electrolytic solution is maintained a a temperature greater than 122.5° C. and less than 155° C., and to effect plating of the eutectic, a potential difference of 3 to 18 volts D.-C. is applied between the conductor and the semiconductor body.

In such an arrangement, the rectifying contact is thereby biased in the direction of difficult conduction, and the voltage drop in the circuit is therefore primarily between the rectifying contact and the semiconductive body. Accordingly, the semiconductive contact and the wire adjoining it are at substantially the same electrical potential, while the semiconductive body is at a potential substantially more positive than that of the contact and the wire. For his reason, and as a further feature of the invention, only the contact and wire are plated by the cadmium-indium eutectic, while the semiconductive body, by contrast, undergoes electrolytic etching. The plating thus is localized to only those elements on which it is desired.

Because the electrolytic solution is above the melting point of the cadmium-indium eutectic, the plated metal flows into the interstices of, and between, the rectifying contact and the lead wire, forming a dense, substantially homogeneous and nonporous joint between the conductor and the contact. After an amount of metal has deposited which is sufficient to join the conductor to the rectifying contact, the plated metal is cooled below its melting point, i.e. 122.5° C., thereby to bond the lead wire firmly to the rectifying contact.

In another preferred embodiment of the invention, the conductor is initially positioned in spaced relationship to the rectifying contact and, as described hereinafter in detail, a globule of molten metal is plated onto the conductor in an amount sufficient to join the conductor to the rectifying contact. The plated metal is then cooled below its melting point, thereby forming a firm bond between conductor and contact.

In still another preferred embodiment of the invention, a rectifying junction in the semiconductor body and an appropriate contact for connection thereto are formed at substantially the same time that the lead conductor is attached to the body. More particularly, the conductor is positioned adjacent the semiconductor body, in a solution which contains metal which forms a rectifying junction when alloyed with the aforesaid body. A positive potential is applied to the semiconductive body, while a negative potential is applied to the conductor. As in the prior embodiments and in accordance with my invention the solution is maintained at a temperature above the melting point of the plated metal. Upon the application of the aforementioned potentials, the metal is deposited in molten form upon the conductor, particularly at that portion nearest the semiconductive body. When sufficient molten metal has plated onto said conductor, this metal comes into contact with the semiconductive body and wets it. Moreover, if the temperature is sufficiently high, alloying of the molten metal with the semiconductive body occurs. Accordingly, when the metal joining the semiconductive body with the conductor is cooled below its melting point, a firm bond is formed between the semiconductive body and the conductor, and moreover a rectifying junction is formed in the semiconductive body, to which junction is intimately bonded a rectifier contact. This method is especially valuable inasmuch as it assures a firm bonding of the conductor to the rectifier contact without the problem of localizing the plating to the contact.

This method may alternatively be performed by initially biasing the semiconductive body negatively and the conductor positively, thereby to cause the deposition of the metal on the semiconductive body at a position which is determined by the position of the conductor. When a sufficient amount of metal has deposited upon the body to make a satisfactory rectifying junction and rectifier contact, the polarity of the applied potential is reversed, thereby causing plating to occur upon the conductor. This plating may be continued until sufficient metal has plated onto the conductor to join this conductor to the plated rectifier contact. As in the preceding cases, the plated metal may then be cooled to a temperature below its melting point, thereby firmly bonding the conductor to the rectifier contact.

Other advantages and features of the invention will become apparent from the consideration of the following detailed description taken in connection with the accompanying drawings, in which.

It is to be understood that none of the figures is necessarily drawn to scale.

Figure 1A:
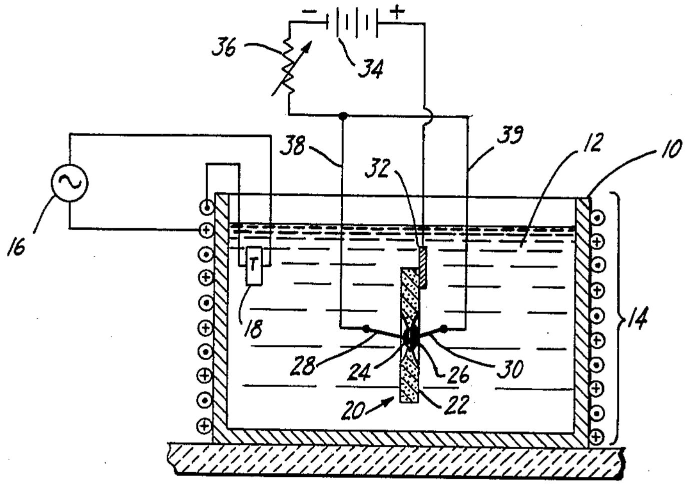
Figure 1A illustrates diagrammatically an electroplating arrangement suitable for use in practicing the invention.

More particularly, Figure 1A shows an electroplating arrangement suitable for joining a pair of conductive elements to the emitter and collector contacts, respectively, of a transistor. Specifically, there is shown a vessel 10, which may be made of an inert insulating material such as glass or fused quartz. Vessel 10 contains a metal-plating solution 12 having a compositon which is discussed in detail hereinafter. This solution is maintained above the melting point of the metal to be plated by means of a bifilar heating element, indicated in cross section at 14, which is arranged to surround vessel 10. To supply energy to heating element 14, a source of electrical energy 16 is provided, which is connected to element 14 by way of a thermostatic element 18. Thermostatic element 18, which is immersed in solution 12, is constructed and arranged to complete the circuit between source 16 and heating element 14 whenever the temperature of solution 12 falls below a predetermined value which is greater than the melting point of the metal to be plated.

Immersed in solution 12 is a first electrically conductive element which, in the embodiment shown in Figure 1A, comprises a transistor 20 having a substantially rectangular semiconductive body 22 of n-type germanium, on opposing surfaces of which substantially coaxial depressions have been formed. In these respective depressions, there have been plated a surface-barrier emitter contact 24 and a surface-barrier collector contact 26, each of which may be composed of the metal indium. The two coaxial depressions in body 22, and the plated contacts 24 and 26 may be formed by utilizing the jet electrolytic process described in detail in the copending patent application Serial No. 472,824 of J. W. Tiley and R. A. Williams, filed December 3, 1954, entitled "Semiconductive Devices and Methods for the Fabrication Thereof," and assigned to the assignee of the present application. Accordingly, no further discussion of the process is deemed necessary herein.

Adjoining emitter and collector contacts 24 and 26 are conductive elements 28 and 30, respectively, which, in the present embodiment, are the lead wires which are to serve as external connections for contacts 24 and 26. These lead wires may be constituted of platinum containing 10 percent by weight of ruthenium. Although not shown in the drawing, lead wires 28 and 30 may be supported in the solution 12 by a base structure of conventional form, or alternatively by means of appropriate clamps. To provide an ohmic electrical connection to semiconductive body 22, a base tab 32 may be affixed thereto, preferably by means of a tin solder.

In accordance with my invention, lead wires 28 and 30 are bonded to emitter contact 24 and collector contact 26, respectively, by electroplating a joint of molten metal between each lead wire and its contact, and subsequently cooling this molten metal. To accomplish this, there is provided a source of direct voltage 34 having its positive pole connected directly to base tab 32 of transistor 20, and its negative pole connected, via a variable current-limiting resistor 36 and conductors 38 and 39, to lead wires 28 and 30 adjoining emitter contact 24 and collector contact 26, respectively. Source 34 is arranged to develop, between lead wires 28 and 30 and contacts 24 and 26 on the one hand, and base tab 32 on the other hand, a voltage in excess of the deposition potential of the metal to be plated. As a further feature of the invention, the potentials supplied by source 34 have a sense such that contacts 28 and 30 are each biased, with respect to semiconductive body 22, in the sense of difficult conduction.

Accordingly, substantially all of the voltage drop in the energizing circuit occurs across the rectifying barriers existing at the interfaces between contacts 24 and 26, respectively, and semiconductive body 22. Therefore, the portion of body 22 on the more positive sides of the rectifying barriers acts as an anode in the electrolytic process, while contacts 24 and 26, along with lead wires 28 and 30, act as cathodes. As a result, and as an important aspect of the invention, the metal whose ions are contained in solution 12 deposits only on contacts 24 and 26 and on lead wires 28 and 30, in a manner which is shown diagrammatically, in Figure 1B, at 40 and 41 respectively.

As aforementioned, solution 12 is maintained at a temperature which exceeds the melting point of the metal deposited by this electrolytic process. Accordingly, and as another important aspect of the invention, this metal deposits in a molten state on lead wires 28 and 30 and on contacts 24 and 26. This molten metal tends to flow along the surfaces of the lead wires toward the transistor contacts and to enter into the interstices thereof, thereby to form a dense, homogeneous and nonporous joint between each of the lead wires 28 and 30 and its respective contact. To this end the metal employed in the plating process is preferably one which wets the surfaces both of lead wires 28 and 30 and of the emitter and collector contacts 24 and 26. To assure that this molten metal gravitates along the lead wires toward the contacts, these lead wires are preferably slanted down toward the transistor elements, for example, in the manner shown in Figures 1A and 1B.

When a sufficient amount of metal has deposited upon and between emitter contact 24 and lead wire 28, and collector contact 26 and lead wire 30, respectively, the source 34 is disconnected from transistor 20. The transistor and its lead wires are then removed from solution 12, and the plated metal is cooled below its melting point, thereby to form a firm bond between each lead wire and its respective transistor contact.

It is particularly to be noted, as a further important feature of the invention, that the aforedescribed process inherently militates against contamination of the surfaces of semiconductive body 22. More particularly, during the entire electrolytic process, the anodically-poled semiconductive body 22 undergoes etching. This etching is highly desirable, inasmuch as it efficiently maintains uncontaminated the surfaces of the semiconductive body, without resort to inert gases or reducing substances. Consequently, the difficulty of maintaining the requisite cleanliness of the semiconductive surfaces is greatly diminished in this process, as compared to the difficulty encountered in prior-art processes.

Moreover, because solution 12 is maintained at a substantially constant temperature which may be accurately predetermined, there is no danger whatever of melting the indium contacts 24 and 26, or of deleteriously overheating the semiconductive body. In this regard, because the temperature of solution 12 may be accurately controlled, it is possible to use a bonding metal which has a melting point substantially higher than the melting points of many of the solders previously used to join lead wires to transistor contacts, yet slightly below that temperature at which the transistor might be damaged by excessive heat. Consequently, a transistor fabricated by this process may be operated at substantially higher temperatures than many of the prior-art transistors, without incurring the danger of melting the bond between the lead wires and their respective contacts.

In this embodiment of the invention, solution 12 is preferably one from which a cadmium-indium alloy having eutectic composition can be plated. There are many plating solutions which are suitable for this purpose; several of these solutions are disclosed in the copending patent application, Serial No. 510,504, of A. J. Certa and T. J. Manns, filed May 23, 1955, now U.S. Patent No. 2,818,374, entitled Method for Electrodepositing Cadmium-Indium Alloys, and assigned to the assignee of the present invention. A particularly suitable plating bath, disclosed in the latter patent application, consists of:

| | Grams |
|---|---|
| Ammonium chloride | 10 |
| Cadmium chloride (anhydrous) | 4.1 |
| Indium trichloride (anhydrous) | 14.5 |
| Ethylene diamine tetra-acetic acid | 35 |
| Glycerin | 100 |

The solution is prepared by dissolving the ammonium chloride, the cadmium chloride and the indium trichloride in the glycerin. The solution is heated to 140° C., after which the ethylene diamine tetra-acetic acid is dissolved therein. The solution is then established and maintained, under thermostatic control, at a temperature in the range of 125° to 130° C. Next, transistor 20 is immersed in this solution in the manner already described, and a potential difference of approximately 3 to 18 volts is applied between base tab 32, and emitter and collector contacts 24 and 26. Under these conditions a cadmium-indium alloy having substantially eutectic composition is deposited, as aforedescribed, on lead wires 28 and 30 and on contacts 24 and 26 (see Figure 1B). In this regard, an enlarged cross-sectional view of the mode in which this deposition occurs is shown in Figure 1B.

The plating operation is continued for a time interval adequate to permit the metal to deposit on the aforementioned lead wires and contacts, in an amount sufficient to form a strong bond therebetween. In practice a plating time of 10 to 15 seconds suffices for this purpose. After a sufficient amount of metal has deposited, transistor 20 is disconnected from source 34, and is cooled below 122.5° C., the melting point of the cadmium-indium eutectic. This cooling may be accomplished, for example, merely by removing transistor 20 from solution 12 and permitting it to stand in air at room temperature, e.g. 25° C.

After the transistor has been cooled, iti s cleansed thoroughly, thereby to obtain superior and uniform operating characteristics between successive transistors processed according to my invention. To effect this cleansing, the transistor may be immersed in a concentrated (e.g. 5 normal) solution of sodium or potassium hydroxide maintained at a temperature of 80° C. A potential difference of about three volts is then applied between contacts 24 and 26 respectively, and base tab 32. This potential difference is poled so as to maintain the contacts positive with respect to the base tab. The electrolysis is continued for about ten seconds, after which the potential difference is removed from contacts 24 and 26, and tab 32, and the transistor is taken out of the hydroxide solution, rinsed for about one minute under running distilled water, and then dried, preferably in a vacuum.

Figure 1B:
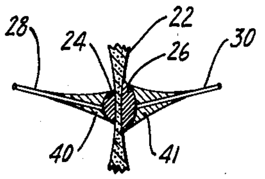
Figure 1B illustrates diagrammatically a cross-sectional view of a bond between a conductor and a semiconductive structure formed by means of the arrangement of Figure 1A.

?In the embodiment of Figures 1A and 1B, the lead wires 28 and 30 are shown positioned in adjoining relationship to the emitter and collector contacts 24 and 26 respectively. However it is not essential to my invention that the lead wires adjoin their respective contacts. The process may alternatively be carried out with either or both of lead wires 28 and 30 spaced a small distance from contacts 24 and 26, respectively. In the latter arrangement, the apparatus is set up as shown in Figure 1A and described hereinbefore. The plating potentials are maintained until a sufficient amount of metal has plated onto lead wires 28 and 30 respectively so that the molten metal flows into contact with contacts 24 and 26, respectively. To facilitate this flow, and as described hereinbefore, the lead wires 28 and 30 are slanted down toward contacts 24 and 26 respectively, thereby causing the molten metal to gravitate towards them. Moreover, the metal chosen is one which wets the contacts to which bonding is desired, a characteristic possessed by the cadmium-indium eutectic alloy whose plating solution was described in detail hereinbefore. As in the preceding form of my novel method, when sufficient metal has plated onto lead wires 28 and 30 to form a desirably strong bond, source 34 is disconnected from transistor 20. The transistor is then cooled and cleansed as described above.

In each of the two preceding forms of the method according to my invention, the contacts 24 and 26 of the transistor 20, to which lead wires 28 and 30 are to be attached, have each been designated as surface-barrier contacts. However, it will be apparent to one sfilled in the art that the method is equally applicable to the attachment of lead wires to the emitter and collector contacts of a junction transistor. For example, if transistor

20 is converted into an alloy-junction transistor by appropriate heating, the two preceding forms of my method may still be utilized to attach lead wires 28 and 30 to contacts 24 and 26, respectively. In this case, contacts 24 and 26 do not themselves produce the rectifying barriers, as they do in the surface-barrier transistor, but instead these contacts provide electrical connections to barriers located deeper within body 22. However, these changes in the positions of the rectifying barriers and in the functions of contacts 24 and 26 do not necessitate any material alteration of the manner in which the method of my invention is applied.

Figure 2A:
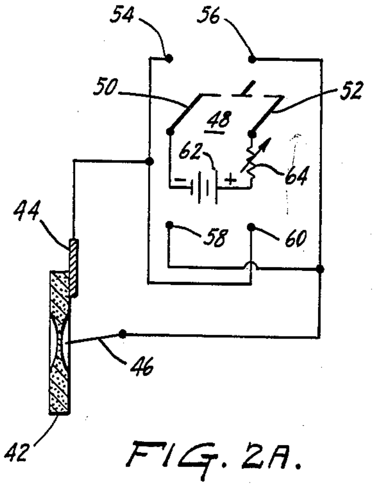
Figure 2A illustrates diagrammatically apparatus suitable for practicing the invention in two other forms.
Figure 2B:
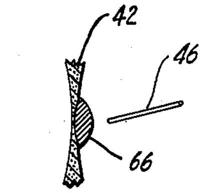
Figures 2B and 2C illustrate diagrammatically and respectively two manners in which metal may be deposited by using the apparatus of Figure 2A.
Figure 2C:
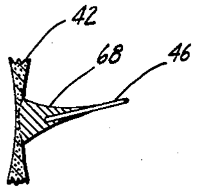

Figures 2A, 2B, and 2C depict apparatus for, and the product produced by a further embodiment of my invention for forming a rectifying junction and an associated rectifier contact on a semiconductive body, and for subsequently bonding a lead wire to this contact. Specifically, Figure 2A illustrates, diagrammatically, apparatus which may be used in practicing my novel method in this form. This apparatus includes an n-type semiconductive body 42 having substantially coaxial depressions formed on opposed surfaces thereof, and also having a substantially ohmic contact 44 affixed thereto. The apparatus additionally includes a lead wire 46 positioned adjacent, and preferably in spaced relationship to, one of the depressed surfaces of body 42. Where it is desired to form, in addition, a rectifying junction and rectifier contact on the other depressed surface of body 42, and to secure a lead wire (not shown) to this contact, it is only necessary to position appropriately the latter lead wire adjacent said other depressed surface and to connect this lead wire conductively to lead wire 46, to the end that the subsequent steps of this form of my method are carried out simultaneously with respect to both lead wires. The apparatus further includes a double-pole double-throw switch 48 having ganged poles 50 and 52, and contact pairs 54 and 56 respectively, and 58 and 60 respectively. The apparatus also includes a source of direct voltage 62 and a current-limiting resistor 64. As shown in Figure 2A, the negative terminal of source 62 is directly connected to switch pole 50, while the positive terminal of source 62 is connected to switch pole 52 via the current limiting resistor 64. In addition, switch 48 is connected as a polarity-reversing switch, contact 54 being directly connected to contact 60 and contact 56 being directly connected to contact 58. Lead wire 46 is directly connected to switch contacts 56—58, while base tab 44 is directly connected to switch contacts 54—60.

In practicing the present embodiment of my novel method, semiconductive body 42 and lead wire 46 are positioned in the aforedescribed manner and immersed, in the manner shown in Figure 1A, in an electrolytic solution which contains ions of a metal which forms a rectifying junction when alloyed with the semiconductive material 42. In the specific arrangement shown, wherein semiconductive body 42 is constituted of n-type germanium (a material having a tenacious surface-oxide film), indium is preferably utilized as the plated metal, inasmuch as it is a metal which forms an excellent rectifying junction when alloyed with n-type germanium. The composition of a suitable solution from which this metal can be plated is discussed hereinafter.

In practicing my method, the switch poles 50 and 52 of switch 48 are initially closed to switch contacts 54 and 56 respectively, thereby to apply a negative potential to semiconductive body 42 and a positive potential to conductor 46. As a result, body 42 is the cathode and conductor 46 the anode, in the electrolysis produced by these potentials. Because conductor 46 is wire-like in form and is positioned almost normal to the surface of body 42, the current stream between conductor 46 and body 42 flows most densely from the end of conductor 46 to points on body 42 which are nearest this end. As a result, body 42 is plated most heavily in the vicinity of the aforementioned points and only very lightly in regions remote therefrom. Moreover, because plating solution 12 is maintained at a temperature exceeding the melting point of the plated metal, this metal is enabled to flow into depressions in the surface of body 42, as well as to maintain intimate contact with elevations of this surface. This intimate contact promotes the alloying of the molten metal with the semiconductive material and therefore aids in producing a satisfactory rectifying junction beneath a rectifier contact 66 (see Figure 2B) formed by this plating operation, and also in producing, at a subsequent step, the firm bonding of contact 66 to body 42.

When a sufficient amount of metal has been deposited on body 42 to form a rectifier contact of the desired size, switch 48 is thrown so as to close poles 50 and 52 to switch contacts 58 and 60, respectively. The latter closure of switch 48 reverses the polarities of the respective potentials applied to body 44 and conductor 46. As a result plating now takes place on conductor 46. Because the plated metal deposits on conductor 46 in molten form, and because conductor 46 is tilted slightly downwardly, a globule of the molten metal forms at the end of the conductor nearest body 42. When sufficient time has elapsed, e.g. 10 to 20 seconds, the globule becomes sufficiently large to flow into and merge with contact 66, which was previously formed on body 42 and which is itself in a molten state. In this manner, joint 68 (see Figure 2C) is formed.

After joint 68 has been formed switch 48 is opened, thereby terminating the electrolysis, and body 42, conductor 46, contact 66 and joint 68 are removed from electroplating solution 12 and cooled below the melting point of the plated metal, thereby bonding conductor 46 firmly to body 42 by means of rectifier contact 66 and joint 68.

As aforementioned, indium is a suitable plating metal for use in the latter form of my novel method. A particularly good solution from which to electrodeposit this metal is one disclosed in the copending patent application, Serial No. 544,375, of G. L. Schnable, filed November 1, 1955, now U.S. Patent No. 2,845,387, entitled "Method of Electrodepositing Metals," and assigned to the assignee of the present application. This solution consists of the following substances:

| | Grams |
|---|---|
| Zinc chloride | 30 |
| Ammonium chloride | 10 |
| Indium metal | 10 |

The zinc chloride and ammonium chloride are intimately mixed and are heated in a refractory vessel until a clear melt is obtained. The melt is then cooled to about 220° C. (a temperature above 155° C., the melting point of indium), and the indium metal is added thereto. The fused salts and the molten indium metal are heated for several hours at 220° C., after which time most, but not all, of the indium metal has reacted with the fused salts in the melt to form indium monochloride, which, on formation dissolves into the melt. The latter solution is then established at a temperature exceeding 180° C. and less than about 250° C., and the semiconductive body 42 and lead wire 46 are immersed therein as aforedescribed. When utilizing this solution, an energizing potential of about 4.5 volts is preferably applied between body 42 and conductor 46.

Other plating solutions which are also suitable for this process are described in the above-identified Schnable application. Therefore it is believed that no further discussion of this matter is required.

In a third embodiment of my novel method it is feasible to form simultaneously a rectifying junction and an associated rectifier contact upon a semiconductive body, and to bond thereto a conductor which may serve as a lead wire to said rectifier contact. In practicing this embodiment the same apparatus as that illustrated in Figure 2A may be used. Semiconductive body 42 and lead wire 46 are immersed in the electrolytic solution 12 in the manner illustrated in Figure 2A wherein lead wire 46 is positioned in spaced relationship to body 42. After body 42 and lead wire 46 are arranged in the electrolytic solution, switch 48 is closed to contacts 58 and 60, thereby applying a negative potential to lead wire 46 and a positive potential to body 42. These potentials are maintained for a time sufficient to plate onto conductor 46 an amount of metal which is adequate to join conductor 46 to body 42.

Figure 3:
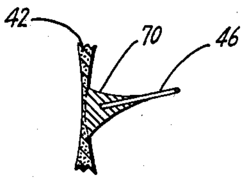
Figure 3 illustrates diagrammatically an additional manner in which metal may be deposited by using the apparatus of Figure 2A.

More specifically, when the process is initiated, the metal plates most heavily at the end of conductor 46 which is nearest the body. Because conductor 46 is slanted downward toward body 42, and because the bath is maintained at a temperature exceeding the melting point of the plated metal, the molten plated metal flows toward the end of conductor 46 nearest body 42, forming a globule of molten metal thereat. When this globule has attained a sufficiently large size, it contacts body 42. Preferably the metal chosen is one which wets body 42, so that, once such contact is made, the metal alloys with the surface of body 42. The plating process is continued until an amount of metal is deposited which is sufficient to form, on body 42, a rectifying junction and an associated contact, and to bond conductor 46 securely to body 42. This plated metal may take the form shown diagrammatically at 70 in Figure 3.

When a sufficient amount of metal has been plated, switch 48 is opened, thereby terminating the electrolysis. The assembly is then removed fom solution 12 and is cooled below the melting point of the plated metal. The resultant semiconductive structure may then be cleansed in the manner described in detail hereinbefore. Thus, by a single operation, a rectifying junction and associated rectifier contact is formed and a lead wire is bonded thereto. It will be clear to those skilled in the art that, by this process, two or more such rectifying junctions and associated contacts may be applied simultaneously to the surfaces of body 42, by appropriate placement of additional conductors adjacent body 42, by connection of all of these conductors to conductor 46, and by performance of this form of my novel electrolytic process.

The electrolytic solution utilized in the latter form of my method may have the same composition as the solution described in connection with the embodiment of Figures 2A to 2C, i.e. a solution applying indium ions. Body 42, as aforementioned, is preferably constituted of n-type material, e.g. n-type germanium (a material having a tenacious surface-oxide film). Under these conditions, even after the molten metal 70 makes contact to body 42, there is a high electrical resistance between conductor 46 and body 42. For this reason body 42 continues to act as the anode, and conductor 46 and plated metal 70 act as the cathode, in the electrolysis. Thus, while metal 70 is depositing, body 42 is being etched, thereby maintaining the body chemically clean.

While, in each of the three processes described above, I prefer to utilize a semiconductive body constituted of n-type material, it will be clear to those skilled in the art that the forms of the process described in connection with the Figures 2A, 2B, 2C and Figure 3, may be practiced when the semiconductive body is constituted of a p-type material, e.g. p-type germanium. As in the preceding examples, it is preferable to choose a plating metal which forms a rectifying junction as well as a contact when applied to the semi-conductive body. Where p-type material is used, this plating metal may be, for example, antimony or an alloy constituted of bismuth and antimony. Solutions for plating these metals are well-known to those skilled in the art and the compositions of such solutions may be determined in accordance with the principles set forth in the above-identified patent application of Schnable. It is believed, therefore, that no further discussion of this point is required.

While I have described my invention by means of specific examples and in a specific embodiment, I do not wish to be limited thereto, for obvious modifications will occur to those skilled in the are without departing from the scope of my invention.

What I claim is:

1. In a method for bonding two electrically conductive elements, the steps of positioning said two elements adjacent but spaced from one another in a solution which contains ions of a metal to be plated and which is maintained at a temperature exceeding the melting point of said metal and applying a voltage between said two elements ot plate said metal onto one of said elements in an amout sufficient to provide a deposit extending from said one element to the other of said elements.

2. The method of claim 1, wherein said metal is one which wets said other element.

3. The method of claim 1, wherein said metal is one which wets both of said elements.

4. A method according to claim 1, including the additional step of cooling said metal deposit extending from said one element to said other element to a temperature less than said melting point of said metal.

5. The method of joining a conductive structure to an asymmetrically conductive device having first and second elements and having a lower resistance between said elements when said first element is at a potential more positive than that of said second element than when the relative polarity of said potentials is reversed, said method comprising the steps of positioning said conductive structure adjacent said first element of said asymmetrically conductive device in a solution which contains ions of a metal to be plated and which is maintained at a temperature exceeding the melting point of said metal; applying a positive potential to said second element of said asymmetrically conductive device and a negative potential to said conductive structure; and maintaining said potentials until said metal plates onto said conductive structure in an amount sufficient to join said conductive structure with said first element of said asymmetrically conductive device.

6. The method of bonding a conductive structure to an asymmetrically conductive device having first and second elements and having a lower resistance between said elements when said first element is at a potential more positive than that of said second element than when the relative polarity of said potentials is reversed, said method comprising the steps of positioning said conductive structure in adjoining relationship to said first element in a solution containing ions of a metal to be plated, said metal being one which wets both said first element and said conductive structure and said solution being maintained at a temperature exceeding the melting point of said metal; applying a positive potential to said second element of said asymmetrically conductive device, and a negative potential to said conductive structure; maintaining said potential until said metal plates onto said conductive structure in an amount sufficient to join said conductive structure to said first element of said asymmetrically conductive device; and then cooling said metal joining said structure to said first element to a temperature less than said melting point of said metal thereby to bond said structure to said first element.

7. In a method for bonding a conductive element to a semiconductive structure, the steps of immersing said semiconductive structure and said conductive element in a solution containing ions of a metal to be plated, said solution being maintained at a temperature exceeding the melting point of said metal; initially applying a negative potential to said semiconductive structure and a positive potential to said conductive element, thereby to plate said metal onto said semiconductive structure; subsequently applying a positive potential to said semiconductive structure and a negative potential to said conductive element, thereby to plate said metal onto said conductive element; and maintaining the two last-named potentials until said metal has plated onto said conductive element in an amount sufficient to join said element to said metal plated onto said semiconductive structure.

8. The method of claim 7, wherein said immersing step includes the step of positioning said conductive element adjacent but spaced from said semiconductive structure.

9. The method of claim 7, wherein said semiconductive structure comprises a body of n-type semiconductive material.

10. A method according to claim 7 wherein said metal wets both said conductive element and said semiconductive structure; and comprising the additional step of cooling said metal which joins said element to said metal plated onto said structure to a temperature less than said melting point of said metal.

11. In a method for bonding a conductor to a semiconductive body, the steps of positioning said conductor adjacent but spaced from said body in a solution containing ions of a metal to be plated; maintaining said solution at a temperature exceeding the melting point of said metal; applying to said conductor a potential negative with respect to the potential of said body, and differing from said body potential by an amount exceeding the deposition voltage in said solution of said ions thereby to plate said metal onto said conductor; and maintaining said potential difference until a sufficient amount of metal has plated onto said conductor to join said conductor to said semiconductive body.

12. The method of claim 11, wherein said metal ions comprise ions of a metal which forms a rectifying junction when alloyed with said body.

13. In a method for producing a rectifying barrier in an n-type semiconductive body, a contact in low-resistance connection therewith, and a lead affixed to said contact, the steps of immersing said lead and said body in a solution containing ions of a metal which forms a rectifying junction when alloyed with said body; maintaining said solution at a temperature exceeding the melting point of said metal; initially applying a direct voltage between said body and said lead of polarity such that said body is negative with respect to said lead, thereby to deposit said metal upon said body in molten form; subsequently applying a direct voltage between said body and said lead of polarity such that said lead is negative with respect to said body, thereby to plate said lead with said metal in molten form; and maintaining said last-named voltage until sufficient metal has plated onto said lead to join said lead to said metal deposited upon said body.

14. A method for bonding a conductor to a semiconductive structure comprising an n-type semiconductive body and a rectifier contact separated from said body by a rectifying barrier, said method comprising the steps of positioning said conductor adjacent said rectifier contact within a solution containing ions of a metal to be plated; maintaining said solution at a temperature exceeding the melting point of said metal; applying a direct potential between said body and said conductor of polarity such that said body is positive with respect to said conductor; maintaining said potential until said metal has plated onto said conductor in an amount sufficient to join said conductor to said rectifier contact; and cooling said metal joining said conductor to said rectifier contact to a temperature less than said melting point of said metal.

15. A method for bonding a conductor to a semiconductive body constituted of n-type germanium, said method comprising the steps of positioning said conductor adjacent but spaced from said body within a solution containing ions of a metal which wets said conductor and said n-type germanium and which forms a rectifying junction when alloyed with said n-type germanium; maintaining said solution at a temperature exceeding the melting point of said metal; initially applying between said body and said conductor a direct voltage having a value exceeding the deposition potential, in said solution, of the ions constituting said metal and a polarity such that said body is negative with respect to said conductor, thereby to plate said metal in molten form onto said body; subsequently applying between said body and said conductor a direct voltage having a value exceeding said deposition potential and a polarity such that said body is positive with respect to said conductor, thereby to plate said metal in molten form onto said conductor; maintaining said last-named voltage until said conductor is joined by said metal plated thereon to said metal plated onto said body; and then reducing the temperature to said metal joining said conductor to said body to a value less than said melting point of said metal, thereby to bond said conductor to said body.

16. The method of claim 15 wherein said metal is constituted of indium; wherein each of said two direct voltages has a value exceeding the deposition potential, in said solution, of indium; and wherein the temperature of said solution is maintained at a value greater than 155° C.

17. In a method for bonding lead wires to the emitter and collector contacts of a transistor having an n-type base element, the steps of positioning a first lead wire adjacent said emitter contact and a second lead wire adjacent said collector contact in a solution containing ions of a metal to be plated and which is maintained at a temperature exceeding the melting point of said metal; applying a positive potential to said base element of said transistor and a negative potential to both of said lead wires, thereby to plate said metal onto each of said lead wires; and maintaining said potentials until said metal has plated onto each of said lead wires in an amount sufficient to join said first lead wire to said emitter contact and said second lead wire to said collector contact.

18. A method for metallically bonding a conductive lead to a conductive rectifier contact located on a body of semiconductive material, said body comprising an n-type region separated from said contact by a rectifying barrier, said method comprising the steps of positioning said lead in adjoining relationship to said contact while bathing said contact and at least a portion of said body with an electrolyte containing metal ions; maintaining the temperature of said electrolyte above the melting point of said metal and below the melting point of said conductive electrode; applying to said lead a potential negative with respect to said n-type body region for a time sufficient to provide a molten deposit of said metal joining said lead and said contact; and subsequently cooling said metal below its melting point to provide a mechanical and electrical bond between said contact and said lead.

19. In a method for joining a conductive structure to an asymmetrically conductive device having first and second elements and having a lower resistance between said elements when said first element is at a potential more positive than that of said second element than when the relative polarity of said potentials is reversed, the steps of positioning said conductive structure adjoining said first element in a solution which contains ions of a metal to be plated and is maintained at a temperature exceeding the melting point of said metal; applying a positive potential to said second element of said asymmetrically conductive device and a negative potential to said conductive structure; and maintaining said potentials until said metal plates onto said conductive structure in an amount sufficient to join said conductive structure to said first element of said asymmetrically conductive device.

20. A method for producing a rectifying barrier in a semiconductive body and a contact in low-resistance connection with said barrier, and for securing a conductive lead ot said contact, said method comprising the steps of positioning said conductive lead adjacent but spaced from a surface of said semiconductive body in a solution containing ions of a metal which wets both said lead and said semiconductive body and forms a rectifying junction when alloyed with said body; maintaining said solution at a temperature exceeding the melting point of said metal; initially applying a direct voltage between said body and said lead of polarity such that said body is negative with respect to said lead, thereby to deposit said metal in molten form upon said body; subsequently applying a direct voltage between said body and said lead of polarity such that said lead is negative with respect to said body, thereby to deposit said metal in molten form upon said lead; maintaining said last-named voltage until sufficient metal has deposited upon said lead to join said lead to said metal deposited upon said body; and cooling said metal deposited upon said body and lead to a temperature below said melting point of said metal.

21. A method for bonding a conductor to a semiconductor structure comprising a body constituted of n-type germanium and further comprising a rectifier contact constituted of indium and separated from said body by a rectifying barrier, said method comprising the steps of positioning said conductor adjoining said rectifier contact within a solution containing indium and cadmium ions; maintaining said solution at a temperature greater than about 122.5 degrees centigrade and less than about 155 degrees centigrade; applying between said body and said conductor a direct voltage having a magnitude exceeding the higher-valued of the respective deposition potentials, in said solution, of indium and cadmium, and having a polarity such that said body is at a potential positive with respect to that of said conductor; maintaining said potential until said metal has deposited in molten form onto said conductor in an amount sufficient to join said conductor to said rectifier contact; and cooling said metal joining said conductor to said rectifier contact to a temperature below its melting point, thereby to bond said conductor to said contact.

22. In a method for producing a rectifying barrier in a body of n-type germanium and a contact in low-resistance connection with said barrier, and for bonding a conductor to said contact, the steps of: positioning said conductor adjacent but spaced from said body within a solution containing ions of a metal which wets said conductor and said body and which forms a rectifying junction when alloyed with said n-type germanium; while maintaining said solution at a temperature exceeding the melting point of said metal, applying to said conductor a potential negative with respect to the potential of said body and differing from said body potential by an amount exceeding the deposition voltage in said solution of said ions, thereby to electrodeposit said metal in molten form onto said conductor; and maintaining said potential difference until sufficient metal has electrodeposited onto said conductor to join said conductor to said body.

23. The method of claim 22, wherein said metal ions are indium ions; wherein the potential difference between said body and said conductor exceeds the deposition voltage in said solution of said indium ions; wherein the temperature of said solution is maintained at a value greater than the melting point of indium; and wherein said method comprises the additional step of cooling said electrodeposited metal joining said conductor to said body below said melting point of said indium.

References Cited in the file of this patent

UNITED STATES PATENTS

| | | |
|---|---|---|
| 1,005,628 | Fisher | Oct. 10, 1911 |
| 1,732,317 | Thoma | Oct. 22, 1929 |
| 2,333,567 | Helmore | Nov. 2, 1943 |
| 2,709,154 | Hansgirg | May 24, 1955 |
| 2,857,312 | Williams | Oct. 21, 1958 |